W. CRONENBERG.
FEED DEVICE FOR SEWING MACHINES.
APPLICATION FILED NOV. 11, 1914. RENEWED OCT. 3, 1916.
1,221,692.
Patented Apr. 3, 1917.
4 SHEETS—SHEET 4.
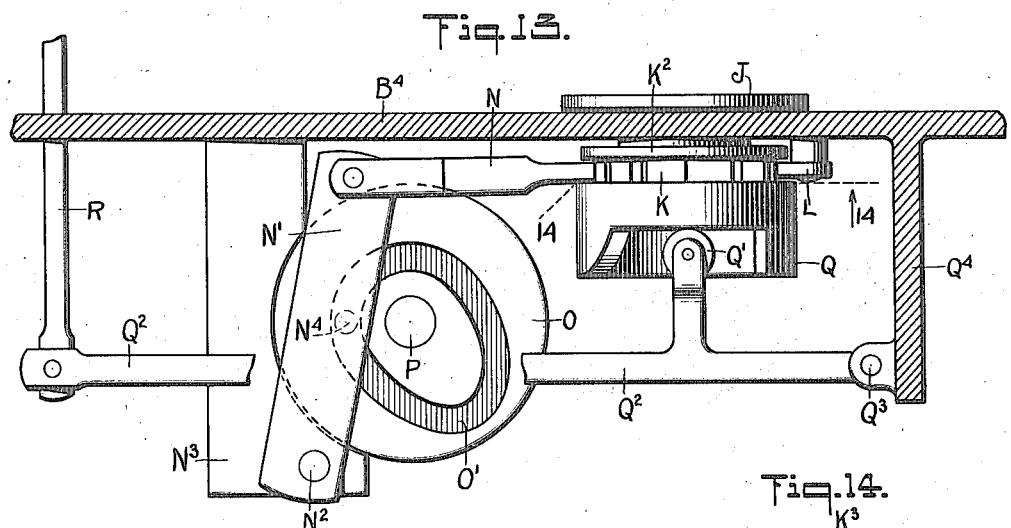
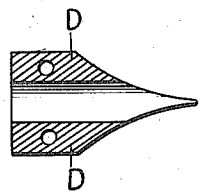
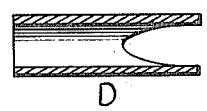
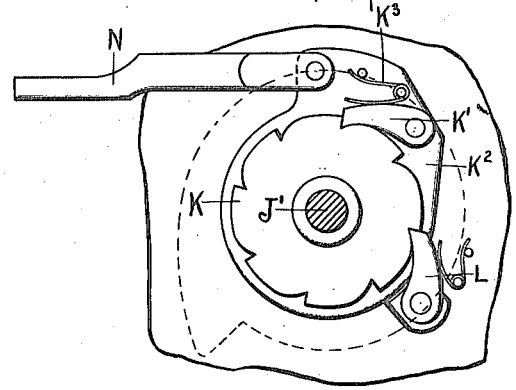
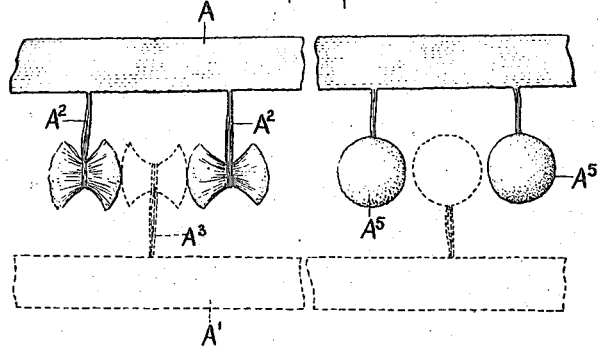
WITNESSES
INVENTOR
William Cronenberg
BY
ATTORNEYS

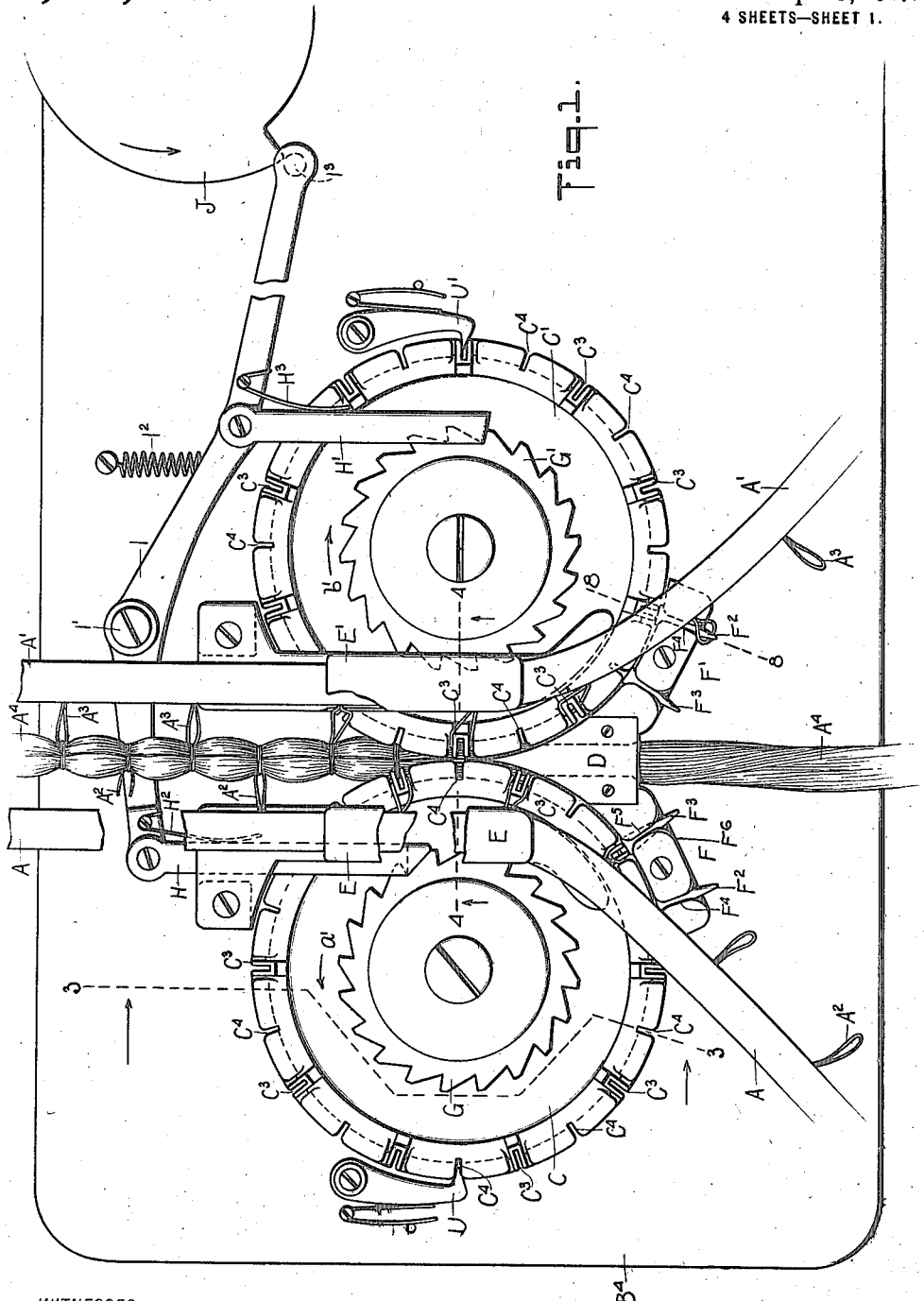

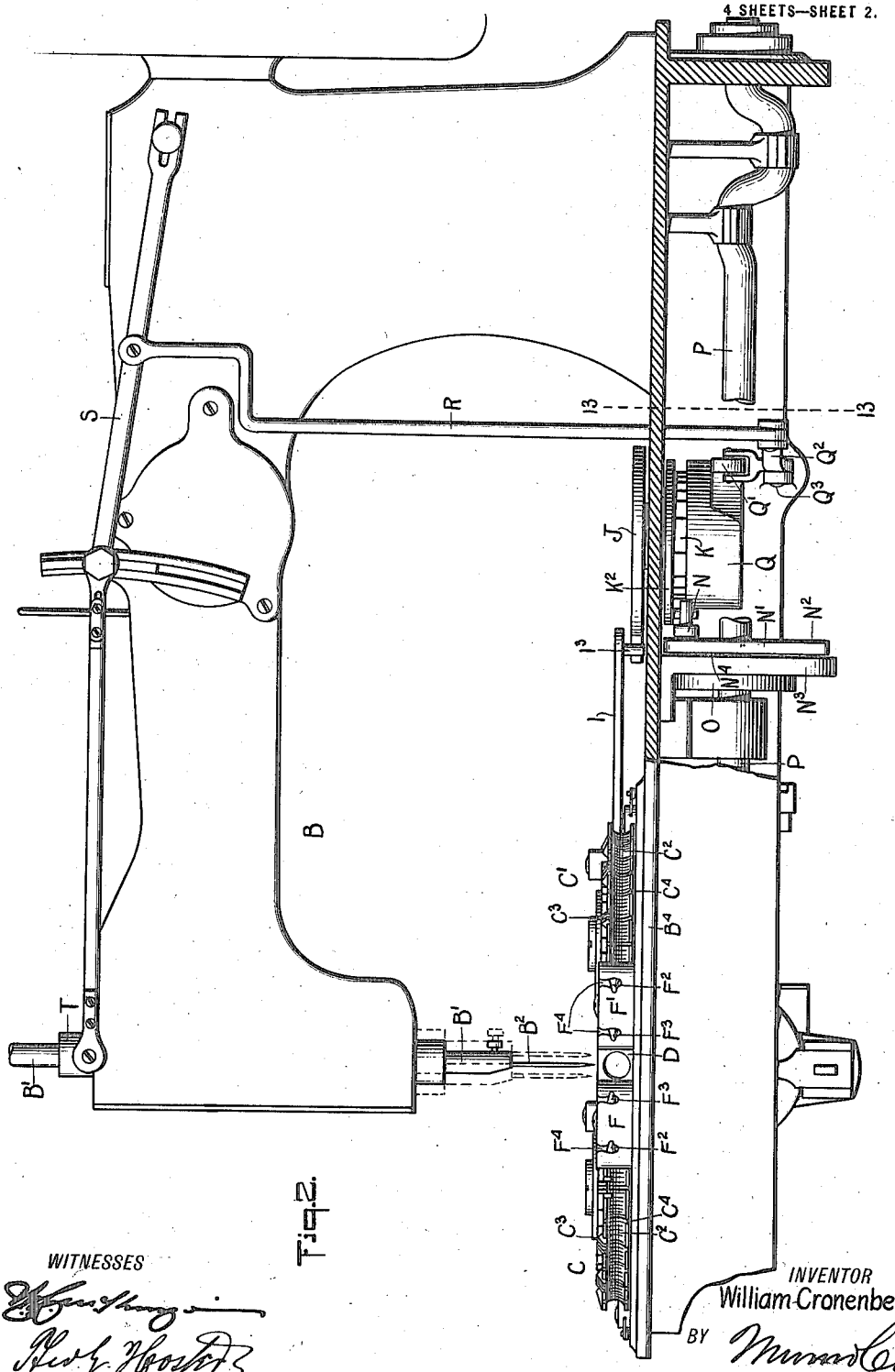

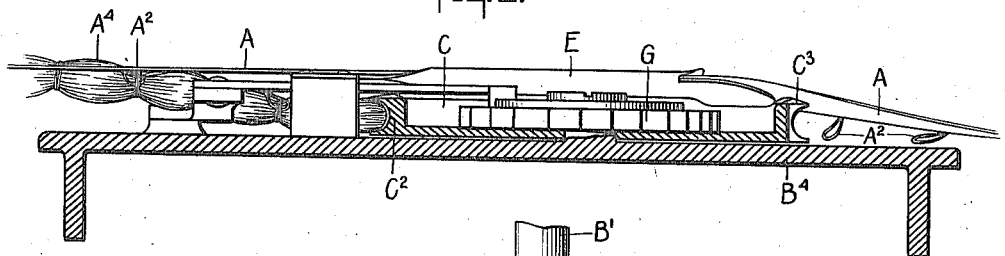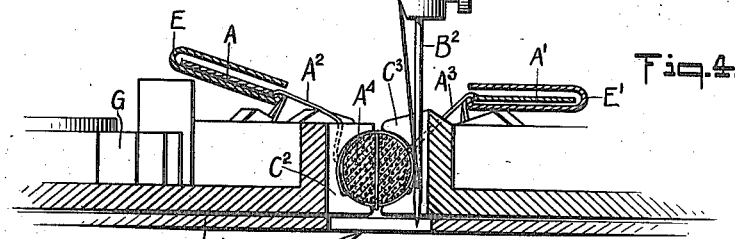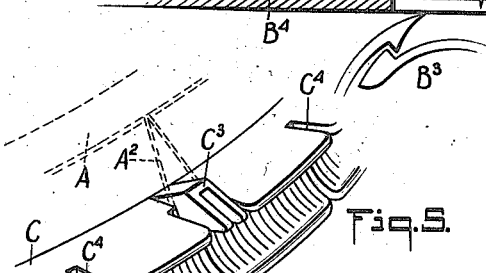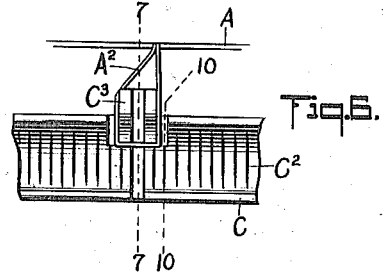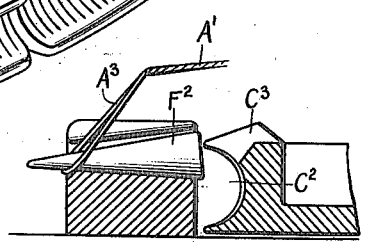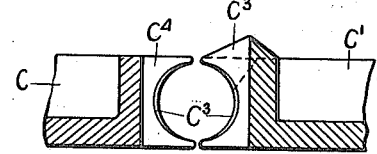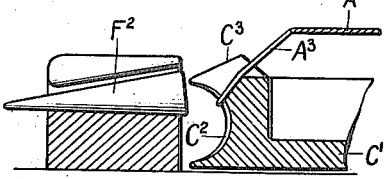

UNITED STATES PATENT OFFICE.

WILLIAM CRONENBERG, OF BROOKLYN, NEW YORK, ASSIGNOR TO MORRIS BERNHARD CO., OF NEW YORK, N. Y.

FEED DEVICE FOR SEWING-MACHINES.

1,221,692.    Specification of Letters Patent.    Patented Apr. 3, 1917.

Application filed November 11, 1914, Serial No. 871,503. Renewed October 3, 1916. Serial No. 123,605.

*To all whom it may concern:*

Be it known that I, WILLIAM CRONENBERG, a citizen of the United States, and a resident of the city of New York, borough of Brooklyn, in the county of Kings and State of New York, have invented a new and Improved Feed Device for Sewing-Machines, of which the following is a full, clear, and exact description.

The invention relates to sewing machines provided with a stitch-forming mechanism having a reciprocating and sidewise oscillating needle bar.

The object of the invention is to provide a new and improved feed device for sewing machines more especially designed for feeding two fringe bodies and a bunch of loose strands simultaneously to the stitch-forming mechanism and relatively to each other so that the bunch of strands is tied at intervals and the fringe loops are sewed alternately to the bunch of strands on opposite sides to ultimately produce two fringes each having tassels or pendants of approximately spherical or globular shape.

In order to accomplish the desired result use is made of a feed device coacting with the stitch-forming mechanism of the sewing machine for intermittently feeding a bunch of strands and two fringe bodies having loops to said stitch-forming mechanism for the latter to sew the loops to the bunch of strands alternately at opposite sides and for looping the sewing threads around the bunch of strands at the loops. Use is also made of delivery means on which the loops of the fringe bodies are placed by the operator and delivered to the feed wheels for the latter to feed the fringe bodies along together with the bunch of loose strands.

A practical embodiment of the invention is represented in the accompanying drawings forming a part of this specification, in which similar characters of reference indicate corresponding parts in all the views.

Figure 1 is a plan view of the feed device as mounted on the table of a sewing machine, parts being shown broken out;

Fig. 2 is a side elevation of the feed device as applied to a sewing machine, part of the latter being shown in section;

Fig. 3 is a cross section of the feed device on the line 3—3 of Fig. 1;

Fig. 4 is a sectional side elevation of the same on the line 4—4 of Fig. 1;

Fig. 5 is a perspective view of a portion of one of the feed wheels;

Fig. 6 is a side elevation of the same and showing a fringe loop in position on the combined hook and needle plate of the feed wheel;

Fig. 7 is a sectional side elevation of the adjacent sides of the feed wheels, the section being on the line 7—7 of Fig. 6;

Fig. 8 is a cross section of the delivery means for delivering a loop to the combination hook and needle plate on a feed wheel, the section being on the line 8—8 of Fig. 1;

Fig. 9 is a like view of the same and showing the loop advanced on the delivery pin;

Fig. 10 is a similar view of the same and showing the fringe loop delivered to the combined hook and needle plate of the feed wheel;

Fig. 11 is a sectional plan view of the tubular guide for the bunch of strands;

Fig. 12 is a sectional side elevation of the same;

Fig. 13 is a cross section of the sewing machine on the line 13—13 of Fig. 2, and showing more particularly the cam mechanism for actuating the feed wheels;

Fig. 14 is a sectional plan view of the same on the line 14—14 of Fig. 13; and

Fig. 15 is a side elevation of the fringe produced by the machine.

In order to form the fringe shown in Fig. 15, two fringe bodies $A$ and $A'$ are fed simultaneously by the feed device through the sewing machine, the fringe bodies being provided with spaced loops $A^2$, $A^3$ to be sewed alternately by the sewing machine to opposite sides of a bunch of loose strands or threads $A^4$, the sewing threads tying the bunch of strands at each loop $A^2$, $A^3$, so that when the bunch of strands is ultimately cut intermediate successive loops $A^2$, $A^3$ then two fringes are formed and the loose strands of each loop readily spread into spherical or globular shape to form a tassel or pendant $A^5$, as will be readily understood by reference to Fig. 15.

The sewing machine B to which the feed device is shown applied is provided with a stitch-forming mechanism consisting of a sidewise oscillating needle bar $B'$ carrying a sewing needle $B^2$ operating in conjunction with a looper mechanism $B^3$ arranged below the table $B^4$ of the sewing machine, as plainly shown in Fig. 4. On the top of the table $B^4$ are arranged two horizontally disposed feed wheels C, C' arranged one alongside the other and with their adjacent peripheral edges at the needle $B^2$ so that the latter operates alternately in conjunction with the two feed wheels, as hereinafter more fully explained. The feed wheels C, C' are alike in construction and each is provided on its peripheral face with an annular feed groove $C^2$, the wall of which is preferably roughened or ribbed to cause the walls of the two feed wheels to take a good hold of the bunch of strands $A^4$ to feed the same rearwardly at the time the wheels C, C' are rotated intermittently in unison and at the time the needle is out of engagement with the feed wheels (see Fig. 2). The rim of each feed wheel C, C' is provided with spaced combined hooks and needle plates $C^3$ and needle plates $C^4$ alternating with the combined hooks and needle plates $C^3$, and the two feed wheels C and C' are so arranged that the needle plate $C^4$ of one feed wheel is in register with the combined hook and needle plate of the other feed wheel at the time the feed wheels are at rest, and the said registering needle plate and combined hook and needle plate are in alinement with the needle $B^2$ (see Fig. 1). Each needle plate $C^4$ is formed by providing a radial slot in the rim of the corresponding feed wheel C or C' the said slot intersecting the groove $C^2$ and each combined hook and needle plate $C^3$ is in the form of a forked hook which rises above the upper surface of the feed wheel C to receive the corresponding loop $A^2$ or $A^3$ of the fringe body A or A' and to allow the needle $B^2$ to pass through the opening in the fork and through the loop for sewing the latter onto the corresponding side of the bunch of strands $A^4$. By providing the peripheral faces of the feed wheels C, C' with radial feed grooves $C^2$, a central feeding means is provided for the bunch of strands $A^4$, and by providing the rim of each feed wheel with spaced combined hooks and needle plates $C^3$, side feeding means are provided for the fringe bodies A and A' to feed the loops $A^2$, $A^3$ thereof to opposite sides of the bunch of strands $A^4$.

When the feed wheels C and C' are at rest and the needle plate $C^4$ of, say, the feed wheel C is in register with the combined hook and needle plate $C^3$ of the other feed wheel C', with a loop $A^3$ in position on this hook $C^3$, as shown in Fig. 1, then the needle bar B' first descends while in central position thus causing the sewing needle $B^2$ to pass down through the bunch of strands $A^4$ at the middle thereof to form through the looper device $B^3$ a central stitch on the bunch of strands $A^4$. The needle bar B' on rising to uppermost position is next oscillated to, say, the left-hand side, to form on its next descent through the needle plate $C^4$ a second stitch on the left-hand side of the bunch of strands $A^4$. The needle bar on next reaching an uppermost position is oscillated to the right and on its following descent passes through the needle plate of the hook $C^3$ and through the loop $A^3$ to form a third stitch on the right-hand side of the bunch of strands $A^4$, thus attaching the loop $A^3$ to this right-hand side of the bunch of strands $A^4$. This forming of stitches alternately on opposite sides of the bunch of strands $A^4$ is twice repeated so that three stitches are formed on each side of the bunch of strands $A^4$. After the last of the side stitches is formed the needle bar B' on its rise returns to central position and then descends to form another stitch at the middle of the bunch of strands $A^4$. Thus in all eight stitches are formed, two at the middle and three on each side. After the last central stitch has been formed and the needle bar B' has risen to central position above the bunch of strands $A^4$ the feed wheels C, C' are turned in unison until the next hook and needle plate $C^3$ of the feed wheel C and the next needle plate $C^4$ of the feed wheel C' move into register at the needle $B^2$. The feed wheels C and C' now come to rest and the stitch-forming mechanism again makes the eight stitches as above described to fasten the loop $A^2$ of the fringe body A to the left-hand side of the bunch of strands $A^4$ and to tie the bunch of strands at this point by the sewing thread and the shuttle thread. The above described operation is then repeated so that the bunch of strands $A^4$ is tied at intervals and the loops $A^2$, $A^3$ are alternately attached to the opposite sides of the bunch of strands $A^4$.

The bunch of strands $A^4$ is guided between the feed wheels C, C' by a tubular guide D fastened to the table $B^4$ and having its sides segmental to conform to the peripheral faces of the feed wheels C and C', as will be readily understood by reference to Figs. 1, 11 and 12. The fringe bodies A and A' are guided in their rearward movement parallel to the bunch of strands $A^4$ and for this purpose guides E and E' are provided attached to the rear of the table $B^4$ and extending over the upper faces of the feed wheels C and C' at opposite sides of the needle $B^2$. The guides E and E' are open at their inner or opposite edges for the passage of the loops $A^2$, $A^3$ as will be readily understood by reference to Fig. 4.

In order to engage the loops $A^2$, $A^3$ with the corresponding hook $C^3$ of the feed wheels C, C' use is made of two delivery devices F and F' held on the table $B^2$ on opposite sides of the guide D. The delivery devices F and F' are alike in construction, and each is provided with two conical pins $F^2$, $F^3$ mounted loosely in bearings $F^4$, $F^5$ formed in a block $F^6$ secured to the top of the table B⁴. The inner edge of each block F⁶ is segmental and extends close to the peripheral face of the corresponding feed wheel C or C′, and each bearing F⁴ is open at the top and is of sufficient size to allow the conical pin F² a loose movement in the bearing to permit the loop A² or A³ to slide over the pin and through the bearing onto the corresponding hook C³ in register at the time with the inner or base end of the corresponding pin F² or F³. By reference to Fig. 1, it will be noticed that the two pins F², F³ of each delivery device F, F′ are spaced apart a distance corresponding to that between a combined hook and needle plate C³ and the adjacent needle plate C⁴ of the feed wheel, and when the feed wheels C and C′ are at rest the corresponding hook and needle plate C³ and the needle plate C⁴ are in register with the base ends of the pins F² and F³.

Ordinarily the pins F² of the two delivery devices F and F′ are used and the pins F³ are auxiliary pins and are only used in case the operator fails to place a loop A² or A³ on the main pin F² of the corresponding delivery device F or F′. The points of the pins F² and F³ project a slight distance beyond the outer edges of the blocks F⁶ so that the operator in charge of the machine can readily place the loops A², A³ on the outermost pins F² of the delivery devices F and F′. Now when the feed wheels C and C′ are intermittently rotated as previously explained then the fringe bodies A and A′ are pulled rearwardly by the loops A², A³ held in engagement with the hooks C³ of the feed wheels C and C′. As the fringe bodies A and A′ advance the loops A², A³, hooked onto the pins F² by the operator, are caused to slide over the pins and through the bearings F⁴ onto the hook C³ then in register with the base end of the corresponding pin to cause the loop A² or A³ to finally slip over the pin F² and onto the hook C³ (see Figs. 8, 9 and 10). In case the operator fails to place a loop A² or A³ on the corresponding pin F² then the said loop is placed onto the auxiliary pin F³, and as this pin is in register with the corresponding hook C³ on the next turning of the feed wheels C, C′ it is evident that the loop is slipped onto the hook in the same way as above described in reference to the pins F².

Various means may be employed for imparting an intermittent rotary motion to the feed wheels C, C′ in unison with the stitch-forming mechanism. As shown in the drawings, use is made of ratchet wheels G, G′ secured to the upper faces of the feed wheels C, C′ and engaged by pawls H, H′ pivoted on a lever I fulcrumed at I′ on the top of the table B⁴. The pawls H and H′ are pressed on by springs H², H³ to hold the pawls in contact with the peripheral faces of the ratchet wheels G, G′. When the lever I is oscillated the pawls H and H′ impart an intermittent rotary motion to the feed wheels C and C′ in the direction of the arrows a′, b′, as plainly indicated in Fig. 1. The lever I is pressed on by a spring I² and its free end is provided with a pin or friction roller I³ in contact with the peripheral face of a cam J secured on the upper end of a shaft J′ journaled in suitable bearings arranged on the table B⁴ (see Figs. 2, 13 and 14). On the shaft J′ is secured a ratchet wheel K engaged by a pawl K′ fulcrumed on a lever K² mounted to swing loosely on the shaft J′ as a fulcrum. The ratchet wheel K, as shown in Fig. 14, is provided with eight teeth in conformity with the number of stitches required for tying a loop A² or A³ to the bunch of strands A⁴, but it is understood that when it is desired to make more or less central and side stitches at a time on the bunch of strands A⁴ then the number of teeth in the ratchet wheel K are correspondingly increased or diminished. The pawl K′ is pressed on by a spring K³ to hold the pawl in engagement with the teeth of the ratchet wheel K. A spring-pressed block L is pivoted on the under side of the table B⁴ and engages the teeth of the ratchet wheel K to hold the latter against return movement. The lever K² is pivotally connected by a link N with the upper end of a lever N′ fulcrumed at its lower end at N² on a bracket N³ depending from the table B⁴. The lever N′ is provided intermediate its ends with a pin or friction roller N⁴ engaging a cam groove O′ in a cam O secured on the main shaft P of the sewing machine so that when the shaft P is turned a rotary motion is given to the cam O to impart a swinging motion to the lever N′ which by the link N, lever K² and pawl K′ causes the ratchet wheel K to rotate intermittently to rotate intermittently the cam J. The intermittent rotary motion given to the cam J causes an intermittent swinging of the lever I to cause the pawls H and H′ to intermittently turn the ratchet wheels G, G′ and consequently the feed wheels C, C′, as above described.

On the lower end of the shaft J′ is secured a cam Q engaged by a friction roller Q′ journaled on a lever Q² pivoted at Q³ on a bracket Q⁴ attached to or forming part of the table B⁴. The lever Q² is pivotally connected by a link R with the mechanism S for imparting a sidewise swinging motion to the pivoted frame T in which the needle bar B′ is mounted to slide up and down. As this mechanism S and frame T are of the usual construction in sewing machines of this type further detailed description of the same is not deemed necessary, it being understood that the cam Q is so arranged that the desired sidewise swinging movement is given to the needle bar B' in unison with the intermittent turning of the feed wheels C, C' as above described.

In order to prevent accidental return movement of the feed wheels C, C' use is made of spring-pressed dogs U and U' fulcrumed on the top of the table B⁴ and adapted to engage successively the combined hooks and needle plates C³ and the needle plates C⁴, as will be readily understood by reference to Fig. 1.

Having thus described my invention, I claim as new and desire to secure by Letters Patent:

1. In combination, with stitch-forming mechanism having a looper and a needle bar having up and down and sidewise oscillating movements, an intermittently actuated feed device coacting with the said stitch-forming mechanism and having means for intermittently feeding a bunch of strands to the said stitch-forming mechanism, the said feed device having spaced hooks adapted to be engaged by fringe loops on a fringe body to feed the latter in unison with the said bunch of strands to the said stitch-forming mechanism for the latter to sew a loop to the said bunch of strands and to loop the sewing thread around the bunch of strands.

2. In combination with stitch-forming mechanism having a looper and a needle bar having up and down and sidewise oscillating movements, an intermittently actuated feed device coacting with the said stitch-forming mechanism and having means for intermittently feeding a bunch of strands to the said stitch-forming mechanism, the said feed device having spaced combined hooks and needle plates, of which the hooks are adapted to be engaged by fringe loops on a fringe body and the sewing needle is adapted to pass through the needle plate, a central guide for guiding the bunch of strands to the said feeding device, and a side guide for the passage of the fringe body and open at its inner side for the passage of the fringe loops.

3. In combination with stitch-forming mechanism, a pair of intermittently revolving feed wheels coacting with the said stitch-forming mechanism, the said feed wheels having peripheral grooves for feeding a bunch of strands between them, the said feed wheels being provided along the peripheries with spaced combined hooks and needle plates, of which the hooks are adapted to be engaged by the fringe loops and the sewing needle is adapted to pass through the needle plate.

4. In combination with stitch-forming mechanism, a pair of intermittently revolving feed wheels coacting with the said stitch-forming mechanism, the said feed wheels having peripheral grooves for feeding a bunch of strands between them, and the said feed wheels being provided along the peripheries with spaced combined hooks and needle plates, of which the hooks are adapted to be engaged by the fringe loops and the sewing needle is adapted to pass through the needle plate, the combined hooks and needle plates of the said feed wheels being arranged alternately.

5. In combination with stitch-forming mechanism, a pair of intermittently revolving feed wheels coacting with the said stitch-forming mechanism, the said feed wheels having peripheral grooves for feeding a bunch of strands between them, the said feed wheels being provided along the peripheries with spaced combined hooks and needle plates, of which the hooks are adapted to be engaged by the fringe loops and the sewing needle is adapted to pass through the needle plate, the combined hooks and needle plates of the said feed wheels being arranged alternately, and needle plates intermediate the said combined hooks and needle plates.

6. In combination with stitch-forming mechanism, a pair of intermittently revolving feed wheels arranged one alongside the other and having peripheral grooves for feeding a bunch of strands between them, each wheel having spaced needle plates along its peripheral face and spaced combined hooks and needle plates arranged alternately relative to the needle plates, the hooks being adapted to receive loops of the fringe body, the needle plate of one feed wheel and the combined hook and needle plate of the other feed wheel registering with each other at the stitch-forming mechanism.

7. In combination with stitch-forming mechanism, a pair of intermittently revolving feed wheels arranged one alongside the other and having peripheral grooves for feeding a bunch of strands between them, each wheel having spaced needle plates along its peripheral face and spaced combined hooks and needle plates arranged alternately relatively to the needle plates, the hooks being adapted to receive loops of the fringe body, the needle plate of one feed wheel and the combined hook and needle plate of the other feed wheel registering with each other at the stitch-forming mechanism, and delivery means for delivering the fringe loops onto the said hooks of the feed wheels.

8. In combination with stitch-forming mechanism, a pair of intermittently revolving feed wheels arranged one alongside the other and having peripheral grooves for feeding a bunch of strands between them, each wheel having spaced needle plates along its peripheral face and spaced combined hooks and needle plates arranged alternately relative to the needle plates, the hooks being adapted to receive loops of the fringe body, the needle plate of one feed wheel and the combined hook and needle plate of the other feed wheel registering with each other at the stitch-forming mechanism, fixed bearings adjacent the peripheral faces of the said feed wheels and in register with the said hooks and needle plates at the time the feed wheels are at rest, the bearings being open at the tops, and pins mounted loosely in the said bearings and having their points projecting at the front of the bearings for the operator to place the fringe loops in position on the said projecting pin ends.

9. In combination with stitch-forming mechanism, a pair of intermittently revolving feed wheels arranged one alongside the other and having peripheral grooves for feeding a bunch of strands between them, each wheel having spaced needle plates along its peripheral face, and spaced combined hooks and needle plates arranged alternately relative to the needle plates, the hooks being adapted to receive loops of the fringe body, the needle plate of one feed wheel and the combined hook and needle plate of the other feed wheel registering with each other at the stitch-forming mechanism, fixed bearings adjacent the peripheral faces of the said feed wheels and in register with the said hooks and needle plates at the time the feed wheels are at rest, the bearings being open at the top, pins mounted loosely in the said bearings and having their points projecting at the front of the bearings for the operator to place the fringe loops in position on the said projecting pin ends, fixed auxiliary bearings rearward of the first-named bearings, and auxiliary pins in the said auxiliary bearings.

10. A feed device for sewing machines having a feed wheel provided on its peripheral face with an annular feed groove, combined hooks and needle plates on the periphery of the feed wheel, and needle plates on the periphery of the feed wheel and alternating with the said combined hooks and needle plates.

11. A feed device for sewing machines having a feed wheel provided at its peripheral face with an annular feed groove and with spaced forked hooks each adapted to receive a fringe loop, each forked hook forming a needle plate for the passage of the sewing needle.

12. A feed device for sewing machines having a feed wheel provided at its peripheral face with an annular feed groove and with spaced forked hooks each adapted to receive a fringe loop, each forked hook forming a needle plate for the passage of the sewing needle, the needle plate intersecting the feed groove.

13. In combination with a stitch-forming mechanism, an intermittently revoluble feed wheel coacting with the said stitch-forming mechanism and provided at its periphery with forked hooks forming a needle plate and adapted to receive fringe loops, the sewing needle in its descent passing through the opening of the hook.

14. In combination with stitch-forming mechanism having a sidewise oscillating needle bar, a pair of feed wheels coacting with the said stitch-forming mechanism and rotating intermittently, the feed wheels having peripheral feed grooves for feeding a bunch of loose strands, each feed wheel having alternating hooks and needle plates along its periphery, a hook on one feed wheel registering with a needle plate of the other feed wheel at the time the wheels are at a standstill, the registering hook and needle plate then being in coacting position with the needle bar.

15. In combination with a stitch-forming mechanism having a sidewise oscillating needle bar, a pair of feed wheels coacting with the said stitch forming mechanism and rotating intermittently, the feed wheels having peripheral feed grooves for feeding a bunch of loose strands, each feed wheel having alternating hooks and needle plates along its periphery, a hook of one feed wheel registering with a needle plate of the other feed wheel at the time the feed wheels are at a standstill, the registering hook and needle plate then being in coacting position with the needle bar, a fixed tubular guide for feeding a bunch of strands to the said peripheral grooves, fixed bearings adjacent the peripheral faces of the feed wheels on opposite sides of the said guide, the bearings being open at the top and at both ends, and a conical pin loosely held in each bearing and having its point projecting at the front of the bearing.

16. In combination with a stitch-forming mechanism having a sidewise oscillating needle bar, a pair of feed wheels coacting with the said stitch-forming mechanism and rotating intermittently, the feed wheels having peripheral feed grooves for feeding a bunch of loose strands, each feed wheel having alternating hooks and needle plates along its periphery, a hook of one feed wheel registering with a needle plate of the other feed wheel at the time the feed wheels are at a standstill, and means for rotating the said feed wheels intermittently.

17. In combination with stitch-forming mechanism having a looper and a needle bar having up and down and sidewise oscillating movements, a feed device having central feeding means for intermittently feeding a bunch of strands centrally relatively to the stitch-forming mechanism, the said feed device also having feeding means at the side for intermittently feeding a fringe body having spaced loops to the said stitch-forming mechanism at one side of the said bunch of strands for the said stitch-forming mechanism to sew a loop to the said bunch of strands at the side thereof and to loop the sewing thread around the bunch of strands.

18. In combination with stitch-forming mechanism having means for forming a series of central and side stitches, a feed device coacting with the said stitch-forming mechanism and having central feeding means for intermittently feeding a bunch of strands centrally to the said stitch-forming mechanism, the said feed device also having feeding means at opposite sides of the said central feeding means for intermittently feeding two fringe bodies having loops to opposite sides of the said bunch of strands at the said stitch-forming mechanism for the latter to sew the loops to the bunch of strands alternately on opposite sides thereof and to loop the sewing thread around the bunch of strands.

In testimony whereof I have signed my name to this specification in the presence of two subscribing witnesses.

WILLIAM CRONENBERG.

Witnesses:
   THEO. G. HOSTER,
   PHILIP D. ROLLHAUS.